United States Patent Office 2,968,530
Patented Jan. 17, 1961

2,968,530

SILICON-OXYGEN-NITROGEN COMPOSITION OF MATTER

William Daniel Forgeng and Russell W. Gerby, Niagara Falls, N.Y., assignors to Union Carbide Corporation, a corporation of New York No Drawing. Filed Mar. 20, 1957, Ser. No. 647,209

3 Claims. (Cl. 23—203)

The present invention relates to a novel composition of matter and, more particularly, to a composition of matter composed of essentially silicon, oxygen and nitrogen.

It has been found that a unique compound of silicon exhibiting high resistance to mineral acids and possessing high abrasion and refractory characteristics can be prepared in accordance with either of the several methods described below and devised by us.

The novel composition may be produced by heating elemental silicon, preferably in powdered form, in an atmosphere comprising an oxygen-nitrogen gas mixture. It is important that both oxygen and nitrogen be present in approximately equal percentages to produce the novel compound of the invention.

The composition of the invention has also been produced by nitriding a pellet of silicon bonded with an oxygen-bearing material such as sodium silicate or boric acid. In one example of the practice of that method, 162 grams of 35 x 40 mesh silicon metal were bonded with 10% sodium silicate. The pellet was heated in nitrogen at atmospheric pressure in a carbon resistor furnace, the temperature having been raised from 1100° C. to 1400° C. over a 5-day period. This resulted in a weight gain of 19.1% (nitrogen, oxygen, and carbon). The product consisted of silicon oxynitride and silicon carbide. Chlorination of the product at 500–600° C. resulted in a weight loss of 65%, and the final residue was shown by X-ray diffraction to be the compound of the invention, the chlorinating step having removed the silicon carbide.

A further method by which the novel compound of the invention may be produced comprises heating silicon nitride ($Si_3N_4$) in an atmosphere of oxygen gas at temperatures in excess of about 1650–1700° C.

The novel composition of the invention may also be isolated from admixture with silicon nitride or silicon carbide by chlorination at temperatures between 500–600° C. This method of preparation may be utilized where the production of the novel compound of the invention was effected by the oxidation of silicon nitride, but where the reaction was not carried out for a sufficient period of time to oxidize the entire quantity of silicon nitride reactant, thereby resulting in the production of the novel composition of the invention in admixture with silicon nitride.

The compound of the invention is a white, crystalline solid which, upon chemical analysis, shows the presence of approximately 16.8% oxygen and 17.9% nitrogen. This closely approximates the empirical formula $Si_2ON$, i.e., theoretical weight percentage: 65.2 percent silicon, 18.5 percent oxygen, 16.3 percent nitrogen. It is, therefore, believed that the novel composition of matter of the invention is silicon oxynitride.

The composition of matter of the invention exhibits high refractory properties as indicated by results of heating and oxidation tests which proved that the compound is stable in air at temperatures in excess of 1650° C. to 1700° C. Such a material may, accordingly, be used as a material of construction for refractory vessels, chamber linings and the like which demand refractory characteristics at temperatures up to the order of 1650° C.

The novel composition of the invention may also be employed as an abrasive, tests having indicated that the compound has a hardness permitting the scratching of glass.

Tests have also indicated that the novel composition of matter is substantially resistant to corrosive attack by hydrofluoric acid, hydrochloric acid, nitric acid and sulphuric acid, thereby indicating the utility of the compound as a refractory lining material in corrosive atmospheres of these acids.

It has been found by the Debye-Scherrer X-ray powder diffraction pattern method that the new compound can be indexed on an orthorhombic cell having the following lattice parameters:

$$a_0 = 5.498 \pm 0.005 \text{ A.}$$
$$b_0 = 8.877 \pm 0.005 \text{ A.}$$
$$c_0 = 4.853 \pm 0.005 \text{ A.}$$

The spacings and intensities of three of the prominent lines of the X-ray pattern are as follows:

TABLE I

| Interplanar Spacing | Relative Intensity on Diffracted Beam |
|---|---|
| 4.69 A | 55 |
| 4.44 A | 95 |
| 3.38 A | 100 |

The complete X-ray spectrum obtained in accordance with the Debye-Scherrer powder pattern method is as set forth in Table II.

TABLE II

X-ray powder pattern

| hkl | obs. d | int. | obs. $\sin^2 \theta$ | calc. $\sin^2 \theta$ |
|---|---|---|---|---|
| | A. | | | |
| 110 | 4.69 | 55 | .0597 | .0601 |
| 020 | 4.44 | 95 | .0665 | .0666 |
| 111 | 3.38 | 100 | .1149 | .1158 |
| 200 | 2.753 | 20 | .1730 | .1736 |
| 130 | 2.611 | 40 | .1925 | .1933 |
| 002 | 2.429 | 40 | .2223 | .2228 |
| 201 | 2.394 | 40 | .2289 | .2293 |
| 131 | 2.301 | 24 | .2479 | .2490 |
| 040 | 2.225 | 2 | .2649 | .2664 |
| 112 | 2.151 | 9 | .2837 | .2829 |
| 022 | 2.129 | 2 | .2895 | .2894 |
| 221 | 2.107 | 16 | .2955 | .2959 |
| 202 | 1.819 | 13 | .3965 | .3964 |
| 310 | 1.797 | 16 | .4066 | .4073 |
| 132 | 1.779 | 13 | .4147 | .4161 |
| 150 | 1.690 | 20 | .4596 | .4597 |
| 042 | 1.638 | 2 | .4894 | .4892 |
| 241 | 1.628 | 9 | .4952 | .4957 |
| 151 | 1.595 | 24 | .5159 | .5154 |
| 330 | 1.558 | 20 | .5408 | .5405 |
| 113 | 1.529 | 16 | .5614 | .5614 |
| 060 | 1.479 | 20 | .5999 | .5994 |
| 312 | 1.443 | 16 | .6304 | .6301 |
| 203 | 1.393 | 29 | .6761 | .6749 |
| 152 | 1.385 | 5 | .6843 | .6825 |
| 400 } 133 | 1.374 | 33 | .6952 | { .6944 .6946 |
| 223 | 1.330 | 16 | .7421 | .7415 |
| 401 | 1.322 | 9 | .7509 | .7501 |
| 332 | 1.311 | 33 | .7637 | .7633 |
| 260 | 1.302 | 5 | .7743 | .7730 |
| 350 | 1.274 | 25 | .8084 | .8069 |
| 062 | 1.262 | 25 | .8237 | .8222 |
| 261 | 1.257 | 50 | .8305 | .8287 |
| 004 | 1.213 | 7 | .8917 | .8912 |
| 171 | 1.197 | 7 | .9157 | .9150 |
| 402 | 1.195 | 9 | .9187 | .9172 |
| 114 | 1.174 | 2 | .9518 | .9513 |
| 440 } 153 | 1.168 | 29 | .9618 | { .9608 .9610 |
| 422 | 1.154 | 20 | .9853 | .9838 |

It has been found that the composition of matter of the invention has a refractive index of approximately 1.82, a maximum birefringence (difference between highest and lowest refractive index) of about 0.03, and a density of approximately 3.0.

What is claimed is:

1. A novel composition of matter composed essentially of silicon, oxygen and nitrogen having a refractive index of approximately 1.82 and an X-ray diffraction pattern exhibiting prominent lines at 3.38 A., 4.44 A. and 4.69 A. for diffracted beams having relative intensities of 100, 95 and 55, respectively.

2. A novel solid, crystalline composition of matter, exhibiting substantially high acid resistance, abrasion and refractory characteristics, composed essentially of about 65 percent by weight silicon, 18.5 percent by weight oxygen and 16.5 percent by weight nitrogen and having an X-ray diffraction pattern exhibiting prominent lines at 3.38 A., 4.44 A. and 4.69 A. for diffracted beams having relative intensities of 100, 95 and 55, respectively.

3. The novel composition of matter disilico oxymononitride having the empirical formula $Si_2ON$ having an X-ray diffraction pattern exhibiting prominent lines at 3.38 A., 4.44 A. and 4.69 A. for diffracted beams having relative intensities of 100, 95 and 55 respectively.

References Cited in the file of this patent

UNITED STATES PATENTS

| 2,666,754 | Sears | Jan. 19, 1954 |
| 2,823,980 | Sears | Feb. 18, 1958 |

OTHER REFERENCES

Chemical Abstracts, 1955 vol. 49, 2244e.